Figure 1:
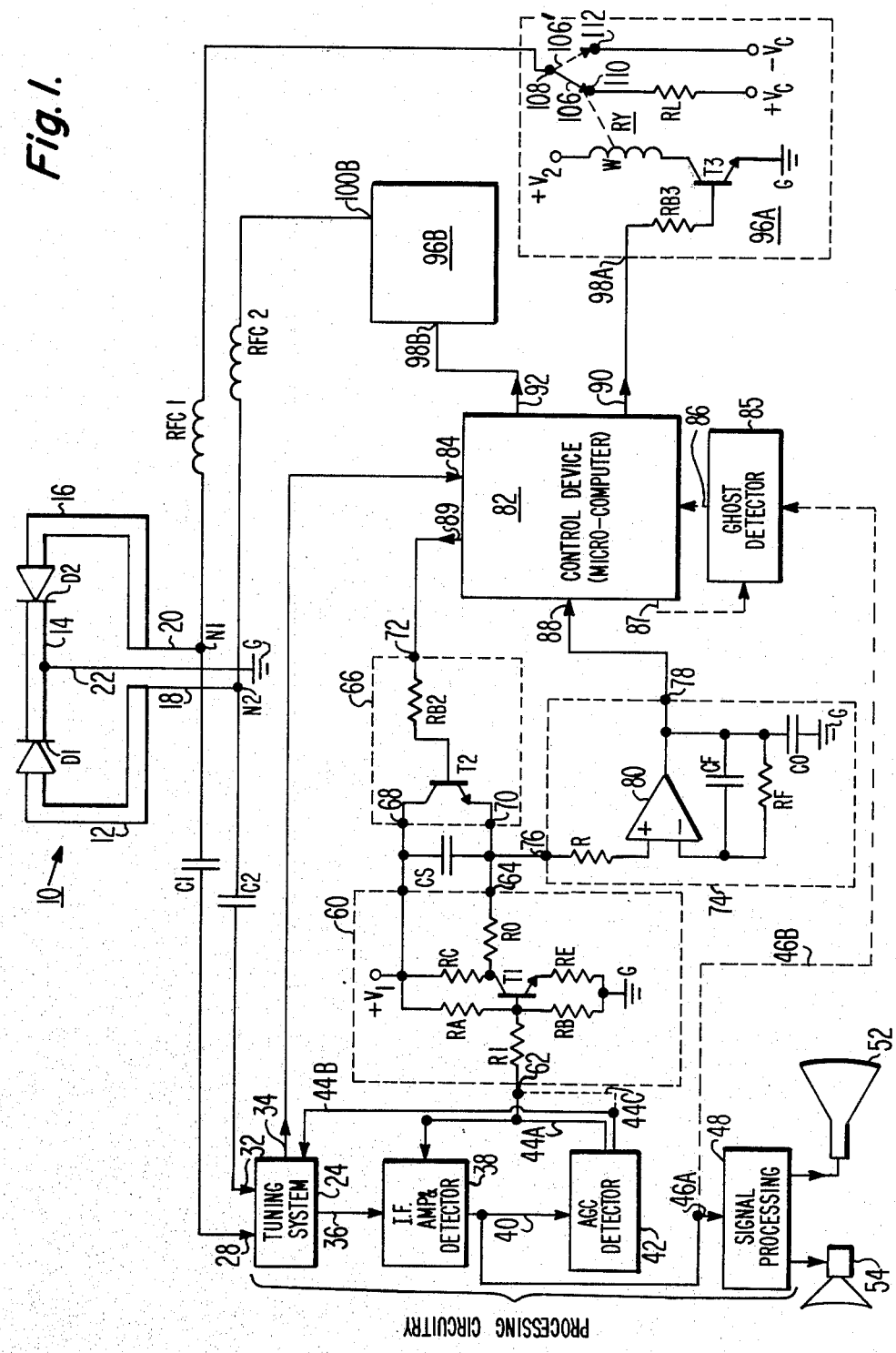

United States Patent [19]

Henderson

[11] 4,349,840

[45] Sep. 14, 1982

[54] APPARATUS FOR AUTOMATICALLY STEERING AN ELECTRICALLY STEERABLE TELEVISION ANTENNA

[75] Inventor: John G. N. Henderson, Princeton, N.J.

[73] Assignee: RCA Corporation, New York, N.Y.

[21] Appl. No.: 210,248

[22] Filed: Nov. 25, 1980

[51] Int. Cl.³ .............................................. H04N 5/44
[52] U.S. Cl. ................................ 358/188; 358/191.1; 455/289
[58] Field of Search ............................ 358/188, 191.1; 455/193, 289, 283, 286, 290

[56] References Cited

U.S. PATENT DOCUMENTS

| | | | |
|---|---|---|---|
| 2,320,124 | 5/1943 | Fobes .................................. | 250/20 |
| 3,206,679 | 9/1965 | Miller . | |
| 3,381,222 | 4/1968 | Gray .................................. | 455/289 |
| 3,537,011 | 10/1970 | Escoula . | |
| 3,636,455 | 1/1972 | Minnor et al. ...................... | 455/289 |
| 3,670,275 | 6/1972 | Kalliomaki et al. . | |
| 4,101,836 | 7/1978 | Craig et al. . | |
| 4,138,654 | 2/1979 | Luhowy ............................. | 455/289 |
| 4,214,273 | 7/1980 | Brown ............................... | 358/188 |
| 4,220,954 | 9/1980 | Marchand .......................... | 343/113 |
| 4,223,310 | 9/1980 | Davidson et al. ................... | 343/100 |
| 4,223,312 | 9/1980 | Gammel ............................. | 343/117 |
| 4,255,740 | 3/1981 | Ferrie ................................. | 340/146.2 |
| 4,255,816 | 3/1981 | Grunza et al. ...................... | 455/277 |
| 4,263,539 | 4/1981 | Barton ................................ | 318/664 |
| 4,317,229 | 2/1982 | Craig et al. ......................... | 455/277 |

FOREIGN PATENT DOCUMENTS 2534888 2/1977 Fed. Rep. of Germany .
581724 10/1946 United Kingdom .

OTHER PUBLICATIONS

Takeda et al., "FM Multipath Distortion in Automobile Receivers Has Been Significantly Reduced by a New Antenna System", IEEE *Transactions on Consumer Electronics*, vol. CE-26, No. 3, Aug. 1980, p. 263.

*Primary Examiner*—Richard Murray
*Attorney, Agent, or Firm*—E. M. Whitacre; P. J. Rasmussen; C. A. Berard, Jr.

[57] ABSTRACT

In a television receiver having an in-cabinet receiving antenna that has a plurality of electrically controllable states having different radiation reception pattern conditions, an automatic antenna steering apparatus selects one of the controllable patterns. In response to the selection of a channel to be received, the apparatus sequences through each of the plurality of states and determines the relative amplitude of the received signal in each. When the amplitude of received signals in all of the states has been determined, the apparatus selects the state wherein the received signal is of a predetermined amplitude condition. One convenient measure of signal amplitude is an internal AGC signal of the receiver. In one embodiment of the present invention a microcomputer is employed to control the various operations to establish the antenna in the state producing the predetermined amplitude condition.

21 Claims, 2 Drawing Figures

APPARATUS FOR AUTOMATICALLY STEERING AN ELECTRICALLY STEERABLE TELEVISION ANTENNA

This invention relates to apparatus for steering an electrically steerable antenna and, in particular, for automatically steering an electrically steerable antenna of a television receiver.

Conventional television (TV) receivers employ monopole or dipole (i.e. "rabbit ears") antennas for receiving television signals in the very high frequency (VHF) television band. The VHF television band includes a lower portion with television signals at frequencies corresponding to channels 2-6 and an upper portion with television signals at frequencies corresponding to channels 7-13. The reception patterns of those antennas are not uniform for all directions from which TV signals are received. As a result, manual adjustment of the position of the antenna is usually necessary to obtain best reception. The viewer will normally have to make such adjustment whenever a new channel is selected. One's ability to position the antenna to obtain best reception is often hampered by the fact that touching or merely being near the antenna disturbs its reception pattern. In addition to those problems, those antennas are considered by some to be unsightly and are susceptible to damage through abuse.

If the receiving antenna is included within the cabinet of the television receiver, the aforementioned problems related to appearance and breakage are eliminated. One antenna suitable for inclusion in a TV receiver is a small loop antenna. Because an in-cabinet loop antenna can also have a non-uniform or directional reception pattern, it is desirable that such an antenna have a plurality of reception pattern conditions or states and an associated apparatus for automatically selecting the one condition providing suitable reception. The present invention is directed to such an arrangement.

The apparatus of the present invention includes a loop antenna and a switch device responsive to an electrical control signal for producing a plurality of reception pattern conditions of the antenna. The amplitude of signals received from the antenna with each reception pattern condition is determined and is compared to automatically determine when the reception pattern condition produces received signal of a predetermined amplitude condition. A control device responds to that comparison and applies the electrical control signals to the switches so as to establish the antenna in the reception pattern condition wherein the predetermined amplitude condition obtains.

Figure 2:
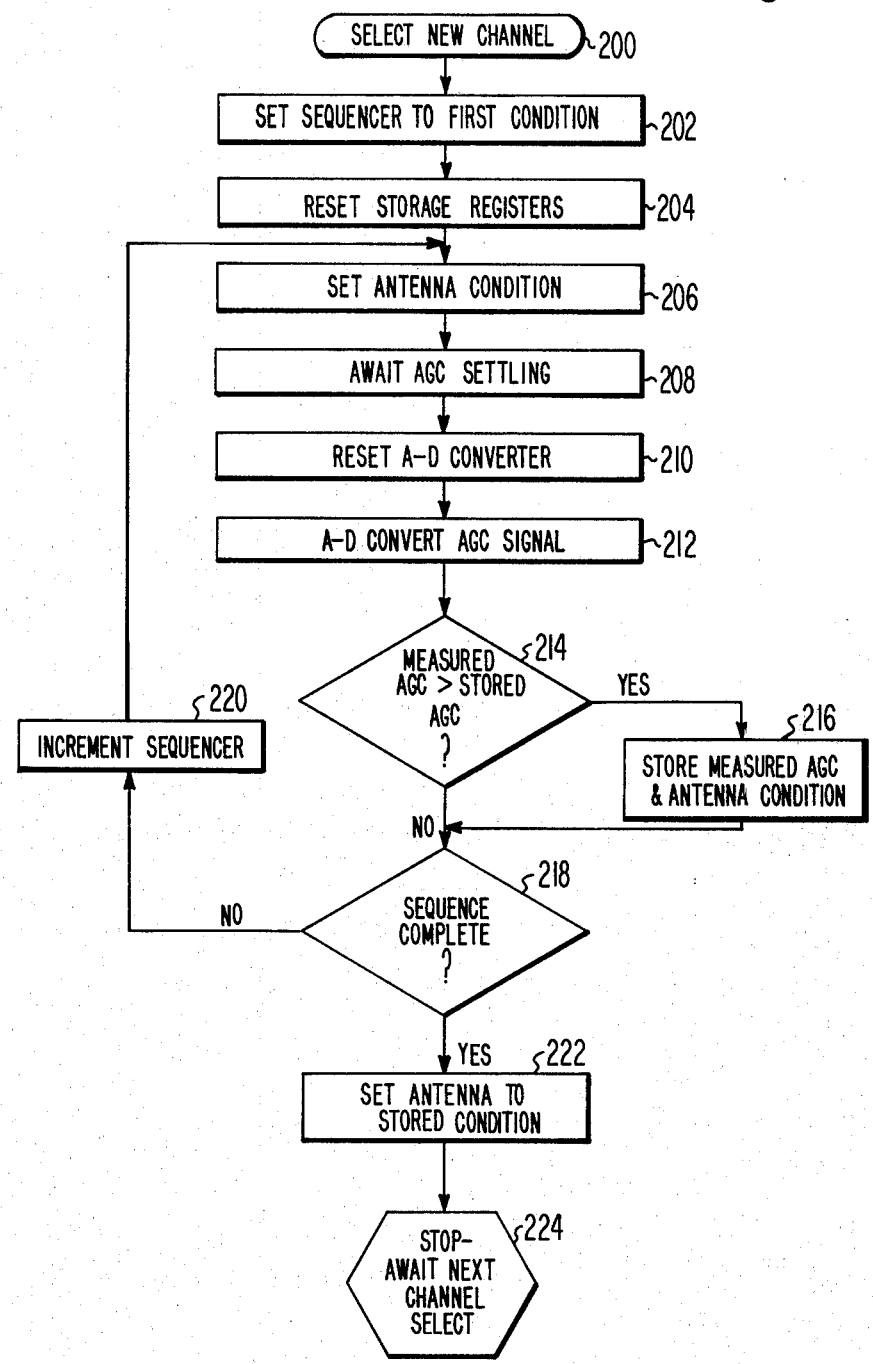

In the drawings:

FIG. 1 is an electrical schematic and block diagram including an embodiment of the present invention; and FIG. 2 is a flow diagram indicating the operation of an embodiment of the apparatus of FIG. 1.

In FIG. 1, antenna 10 of a TV receiver supplies received signals at its feed terminals 18 and 20. Those signals are coupled to input connections 28 and 32 of tuning system 24 via capacitors C1 and C2, respectively. The processing circuitry now to be described is exemplary of a conventional TV receiver (except for antenna 10) in simplified form. In response to the selection of a channel (carrier frequency) by a viewer, tuning system 24 produces a channel change pulse at output 34, the use of which will be explained later. Tuning system 24 includes a radio frequency (RF) amplifier having a variable gain factor and a local oscillator for heterodyning the aforementioned received signal to produce a lower, intermediate frequency (IF) signal at output 36. IF signal is applied to IF amplifier and detector 38, which amplifier exhibits a variable gain factor. IF signals are supplied via conductor 40 to automatic gain control (AGC) detector 42. AGC detector 42 develops signals responsive to the amplitude of the received IF signals from 40. The RF AGC signal on conductor 44B is applied to the RF amplifier within tuner 24 and the IF AGC signal on conductor 44A is applied to the IF amplifier within 38, to control their respective variable gain factors. IF amplifier and detector 38 further provides output signals via conductor 46A to signal processing 48 which includes both video and sound processing circuitry. Signal processing 48 drives loudspeaker 54 to produce audio output and kinescope 52 to provide visual output.

Loop antenna 10 includes conductive portions 12, 14 and 16 and has two control gaps therein across which switch diodes D1 and D2 are connected. Antenna 10 is operated as a balanced antenna with portion 14 connected to ground G through conductor 22. When switch diodes D1 and D2 are both rendered conductive, i.e., assume a closed or ON state, antenna 10 exhibits the characteristics of a conventional loop. That loop exhibits a reception pattern which is directional, i.e., the amplitude of the received signal depends upon the direction from which it is received. That directionality is caused, in part, by the presence of large conductive structures such as kinescope 52 within the TV receiver. When one or the other or both of switch diodes D1 and D2 are reverse biased, i.e., an open state, loop 10 exhibits its respective different reception patterns. The latter are also non-uniform but in a different manner with respect to each other and that of the conventional loop pattern. Thus, by applying electrical control signals to diodes D1 and D2 to control their respective conduction conditions, loop 10 is made to exhibit a plurality of reception pattern conditions.

Loop antenna 10 is fully described in related U.S. patent application Ser. No. 210,249 entitled IMPROVED LOOP ANTENNA ARRANGEMENT FOR INCLUSION IN A TELEVISION RECEIVER filed by R. Torres and O. M. Woodward. The improved antenna described by Torres and Woodward includes switching diodes (e.g., D1 and D2) not described in related U.S. patent application Ser. No. 210,251 entitled LOOP ANTENNA ARRANGEMENTS FOR INCLUSION IN A TELEVISION RECEIVER filed by O. M. Woodward and J. G. N. Henderson. Antenna 10 is desirably tuned by a tuning circuit described in related U.S. patent application Ser. No. 210,247 entitled AUTOMATIC TUNING CIRCUIT ARRANGEMENT WITH SWITCHED IMPEDANCES filed by R. Torres and J. G. N. Henderson. Each of the aforementioned related patent applications was filed on even date herewith, was assigned to the same assignee as is the present invention, which applications are incorporated herein by reference. In particular, FIG. 6 of the Torres and Woodward application shows the aforementioned plurality of reception pattern conditions.

The remaining portion of FIG. 1 is directed to apparatus for automatically determining which of the aforementioned antenna pattern conditions provides a received signal of a predetermined amplitude condition, e.g., as described below wherein the received IF signal on line 42 is of highest amplitude. To evaluate the amplitude of the AGC signal, an analog-to-digital (A-D) converter (60,66,74) is employed. A control device 82, shown by way of example as comprising a microcomputer, controls that A-D converter. Microcomputer 82 includes: an addressable memory for storing operating instructions, commonly referred to as the "program" in form of digital words; input ports 84, 86 and 88 for receiving data; output ports 87, 89, 90 and 92 for transmitting data, also in digital form, to external devices such as devices 66, 96A and 96B to be described later; an addressable data memory for storing received and processed data; and a central processing unit or CPU for processing data in accordance with the stored program referred to above. The CPU operates in accordance with the stored instructions to arithmetically and otherwise modify input data it receives from the aforementioned input ports and data memory to make decisions based on the data to generate output data at the aforementioned output ports. Microcomputer 82 further includes a clock source by which its operations are timed so that the relationship between signals at input and output ports may be in predetermined time sequence in accordance with the stored program. Typically, the program memory is a read only memory (ROM) in which the program is permanently stored, e.g., by the addition or removal of connections in a matrix comprising that memory. Typically, the data memory is a random access memory (RAM) in which the data may be electrically altered.

While control unit 82 is shown and described in terms of a microcomputer, it is also satisfactory that it be a microprocessor. Microcomputers are generally considered to have more computing power than do microprocessors. Thus, although the RCA COSMAC VIP was employed in the apparatus constructed, it appears that other microcomputers would also be suitable. For example, a COP 411 commercially available from National Semiconductor Corp. would be equally satisfactory while resulting in a reduced cost. In addition, microcomputers have often been distinguished from microprocessors in that microcomputers often comprise a single integrated circuit including all of the elements identified above whereas a microprocessor often contains only the CPU and input and output ports and requires the use of external memories, singly or in combination, also in integrated circuit form. Those differences are not material to the apparatus herein described.

The amplitude of the IF AGC signal on conductor 44A is determined from the charge level on capacitor CS. The AGC signal at circuit point 62 is applied to capacitor CS from circuit point 64 of buffer circuit 60. Buffer circuit 60 includes a common-emitter amplifier transistor T1 biased to conduction from supply potential $V_1$ by a voltage divider to its base formed by resistors RA and RB. AGC signal from circuit point 62 is applied to the base of T1 through resistor RI. The emitter of T1 is coupled to ground G through resistor RE which stabilizes the quiescent bias condition of transistor T1. Output signals from the collector of T1 are developed across load resistor RC and coupled to capacitor CS via resistor RO.

The charge level on capacitor CS is coupled to input port 88 of microcomputer 82 by a buffer 74. Amplifier 80 therein receives input signals coupled through resistor R from circuit point 64 and supplies output signals to circuit point 78 which couples to input port 88. A feedback network including resistor RF and capacitor CF completes connection of amplifier 80 as a unity-gain follower. Capacitor CO removes undesirable high frequency signals at circuit point 78.

To initiate a measuring cycle, microcomputer 82 develops a relatively positive signal at output port 89 which is coupled to discharge unit 66. The collector-emitter conduction path of switch transistor T2 is connected across capacitor CS for discharging CS when that relatively positive signal from output port 89 is coupled to the base of T2 via resistor RB2. After a predetermined time delay selected so that CS is substantially discharged to a first predetermined charge level, e.g., 0 volts, the signal at output port 89 becomes relatively negative. Discharge unit 66 then allows CS to charge responsive to AGC potential on connection 42. When the charge level on capacitor CS reaches a second predetermined level as indicated by the voltage at point 64 and therefore, the voltage at input port 88, microcomputer 82 responsive to its stored program determines the amplitude of the AGC signal. That determination is made by determining the period of time over which CS was charged from the first to the second predetermined charge level.

The operation just described allows a microcomputer designed to process digital or binary signals to directly process analog signals. That is accomplished by employing the logic threshold level at input port 88 to serve as a reference potential against which the voltage on CS is compared. The logic circuit within microcomputer 82 to which input port 88 connects thus serves as both an analog reference source and an analog comparator for generating a digital signal detecting the analog signal level across CS. As a result of this arrangement, a separate, complex and costly analog-to-digital converter is not required.

Microcomputer 82 develops signals at output ports 90 and 92 which are coupled to diodes D1 and D2, respectively, by drive circuits 96A and 96B, respectively. When the signal at output port 90 is relatively negative, transistor T3 is off and relay RY is not energized so that arm 106 connects between terminals 108 and 110. Thus positive control potential $+V_C$ is conducted to render switch diode D2 conductive via resistor RL, arm 106, output lead 100A, RF choke RFC1, node N1 and loop conductor 16. Resistor RL determines the value of the forward bias current in D2. When D2 is to be rendered conductive, transistor T3 is biased for conduction by a relatively positive signal from output port 90 coupled to its base from input terminal 98A via resistor RB3. With T3 rendered conductive, supply potential $+V_2$ is applied to control winding W of relay RY moving arm 106 into position 106'. Thus switch diode D2 is reverse biased by control potential $-V_C$ applied through the path just described. It is noted that drive circuit 96A is but one embodiment which can be employed to translate the signals at output port 90 to voltage and current levels satisfactory for rendering diode D2 either forward or reverse biased. A semiconductor switch can be satisfactorily employed in place of relay RY. Drive circuit 96B is of like configuration to 98A and output terminal 100B corresponds to 100A in function. Signals to render switch diode D1 conductive or nonconductive are coupled from output terminal 100B via inductor RFC2, node N2 and loop conductor 12. Chokes RFC1 and RFC2 exhibit high a.c. impedances at VHF frequencies so as to direct substantially all the VHF-TV signals at N1 and N2 to tuner 24.

In an embodiment of the circuit shown in FIG. 1, component values or types in accordance with the table below were employed.

| Component | Value or Type |
|---|---|
| RA | 100 kΩ |
| RB | 33 kΩ |
| RC | 22 kΩ |
| RE | 7.5 kΩ |
| RI | 47 kΩ (for RCA CTC-93 chassis) |
|  | 157 kΩ (for RCA CTC-101 chassis) |
| RO | 1 MΩ |
| RB2, R | 10 kΩ |
| RF | 2 kΩ |
| RB3 | 5.1 kΩ |
| RL | 47 kΩ |
| CS | 0.47 μF |
| CF | 0.1 μF |
| CO | 0.15 μF |
| T1, T2, T3 | 2N 4124 |
| Amplifier 80 | RCA CA 3130 |
| $+V_1$ | 5 v. |
| $+V_C, -V_C$ | 10 v. |

This embodiment is suitably employed, for example, in conventional television receivers having chassis such as RCA's CTC-93 Series, described in Television Service Data File 1978 C-7, and RCA's CTC-101 Series, described in Television Service Data File 1980 C-7, which are both incorporated herein by reference.

Microcomputer 82 receives a channel change pulse at input port 84 from output terminal 34 of tuning system 24 when a new channel selection is made by a viewer. Receipt of the channel change pulse initiates the sequence for automatically steering antenna 10. In that sequence, all useful combinations of signals at output ports 90 and 92 for selectively controlling the conduction of D1 and D2 are generated. Each combination is held for a sufficient period of time to allow determination of the amplitude of the received signal. That measurement is made, for example, by the analog-to-digital conversion process described hereinabove for each of the reception pattern conditions. Those pattern conditions are described in the related application of Torres and Woodward referred to above in relation to FIG. 6 thereof. When the sequence is completed and all conditions tested, and comparison of the amplitude measurements for each have been made, microcomputer 82 establishes electrical control signals at output ports 90 and 92 corresponding to the predetermined amplitude condition (e.g. maximum amplitude) described above for that one of the plurality of reception pattern conditions at which the predetermined amplitude condition was measured. Indications of the quantity representing the amplitude of the received signal and of the reception pattern condition corresponding thereto are stored in the data memory of microprocessor 82 as described above, as are the results of the comparison of those indications.

It is also satisfactory to employ the RF AGC signal to supplement the IF AGC signal under conditions when the received signal is strong. It is also possible to use minimum interference or minimum ghosts as the predetermined amplitude condition for antenna steering.

Accordingly, a ghost determining unit 85 is coupled via conductor 46B to IF processing unit 38 for determining the presence of a signal which would result in a ghost when processed. The output of ghost determining unit 85 is coupled to microcomputer 82 at input port 86. At each antenna reception pattern condition, the parameters of the ghost are stored in a location of the data memory registers of microcomputer 82. Parameters of ghosts may be generated for other reception patterns. In addition, as before, the amplitude for each reception pattern is stored in a respective location of the data memory. The ghost parameters which may be stored, for example, may comprise the peak amplitude of the ghost signal, for example as embodied in either the vertical or horizontal sync pulse portions of the television composite view signal on conductor 46B or its phase deviation from the main or the desired signal. After all responses of all of antenna patterns have been determined, the amplitude conditions are compared and the most desirable antenna reception pattern is established.

By way of example, the predetermined amplitude condition may correspond to the reception pattern which results in the highest amplitude main or desired signal and the lowest amplitude ghost signal. Other conditions, including the phase shift of the ghost signal with reference to the main or desired signal, may also be incorporated. It is understood that ghost detector 85 can operate in response to control signals from port 87 of microcomputer 82. When so controlled, data supplied to input port 86 can be in either serial or parallel format. It is also satisfactory that ghost detector 85 continuously detect the parameters of ghost signals and that microcomputer 82 only accept ghost data in accordance with the sequence stored in its program memory.

The following documents are hereby incorporated by reference to indicate various arrangements for detecting ghosts which may be utilized as ghost detection unit 85 in a television receiver. Specifically, U.S. Pat. No. 3,763,314 entitled GHOST IDENTIFICATION MEANS IN A TELEVISION RECEIVER issued to Y. Murakami on Oct. 2, 1973; U.S. Pat. No. 4,096,529 entitled CIRCUIT FOR DETECTING GHOSTS IN TV ANTENNA SYSTEMS issued to R. E. Baum, et al on June 20, 1978; U.S. Pat. No. 4,128,848 entitled AUTOMATIC GHOST-SUPPRESSION SYSTEM issued to I. Nakagawa on Dec. 5, 1978; U.S. Pat. No. 4,214,273 entitled CIRCUIT FOR INDICATING ANTENNA SIGNAL INPUT LEVEL ON TELEVISION RECEIVER SCREEN issued to T. W. Brown on July 22, 1980; S. Makino et al, and "A Fully Automatic Ghost Canceller". Spring (May–June) 1978, IEEE CE Conference Paper, are so incorporated.

The operation of the embodiment described with respect to FIG. 1 for automatically steering the reception patterns of antenna 10 is graphically illustrated by the flow chart shown in FIG. 2. In essence, the program stored in the program memory of microcomputer 82 follows the sequence illustrated in the flow chart. In the following description, the flow chart of FIG. 2 is described with specific reference to the specific embodiment of FIG. 1. Steps in the sequence are indicated by the numbers in parentheses.

The sequence begins with selection (200) by the viewer of a new channel to be received and the resulting generation of a channel change pulse at lead 34. In response to the channel change pulse at port 84, a sequencer register within the data memory of microcomputer 82 is set (202) for storing a digital word, e.g. comprising two binary digits (bits). That set condition corresponds to a first of the plurality of antenna reception pattern conditions. Also in response to the channel change pulse, other storage registers in the data memory are reset (204) to predetermined initial conditions.

The first antenna reception pattern condition is set (206) by the generation of the appropriate electrical control signals on lines 90 and 92. Thereafter, a predetermined delay is established before proceeding to allow the AGC voltage to settle (208). Either before, during, or after the AGC settling time, the A-D converter is reset (210) by the discharge of capacitor CS under the control of microcomputer 82 as described above. The AGC signal is then measured (212) by the A-D converter and a comparison (214) made against a predetermined amplitude condition. Successive evaluations are made (218, 220 and repeat 206 through 218) to determine which antenna reception pattern configuration most nearly satisfies the predetermined amplitude condition. For the example described above, i.e., that the predetermined condition is the highest amplitude AGC signal, at each antenna reception pattern condition, the respective AGC value is compared (214) with the AGC level previously stored in an appropriate register in the other data memory during the preceeding antenna reception pattern condition. If a new AGC level is greater than the previous one, the new AGC level replaces (216) the previous one in the data memory and the antenna reception pattern control condition (i.e., which of diodes D1 and D2 are conductive) is stored (216) in another register of the data memory used for that purpose. After such storage (216) or if a new AGC level is less than the previous one, a further comparison (218) is made to determine whether the sequence of all possible significant antenna reception pattern conditions has been completed. If the result of that test is negative, the sequencer is incremented (220) to the next in the sequence of antenna reception pattern conditions (206) and the process of measuring (208, 210, 212), comparison testing (214) and storing (216) the AGC level and corresponding antenna reception pattern control condition, if appropriate, is repeated until all of the antenna reception patterns have been examined (218). When the sequence is complete (218), the reception pattern condition at which the predetermined amplitude condition described above was met is retrieved (222) from the data memory storage and the antenna is then set (222) to that stored condition. The sequencer has thus completed an automatic antenna steering control cycle. The apparatus remains (224) in the aforementioned condition until a new channel selection (200) is made, at which time the entire sequence is repeated.

Modifications of the specific embodiment discussed with reference to FIGS. 1 and 2 herein are contemplated to be within the scope of the present invention as defined by the following claims. For example, the manner in which the amplitude of the aforementioned AGC signal is determined may be reversed. I.e., instead of microprocessor 82 measuring the period of time required to charge capacitor CS between first and second predetermined charge levels, it is equally satisfactory that the AGC voltage be applied to capacitor CS for a predetermined period of time and that microprocessor 82 then determine the magnitude of the change of charge level on CS.

Because the IF AGC control signal at connection 44A is most sensitive when the received signals are weak, it is desirable that the IF AGC signal be employed so that better sensitivity will obtain for weak signal conditions. However, it is also satisfactory that an AGC control signal for the RF amplifier of tuning system 24 be employed by connecting lead 44C to node 62 in place of the connection of lead 44A thereto. However, it is understood that the RF AGC signal will tend to be more sensitive to stronger received signals.

In the embodiment of FIG. 1, it is understood that the particular embodiments shown therein are exemplary and that other circuits could be employed with equally satisfactory results.

It is further satisfactory that means other than microcomputer 82 be employed. For example, analog signal processing could obtain by employing a plurality of sample and hold circuits, one of which holds the present measured AGC signal amplitude and the other of which holds the last preceding measured AGC signal amplitude. An analog comparator could determine which of the aforementioned AGC signal amplitudes satisfies the predetermined amplitude condition. In such arrangement, a simple binary counter could be employed to generate the sequence of plurality of antenna reception pattern conditions.

It is also satisfactory that the steps found in the flow diagram of FIG. 2 be combined or interchanged. For example, steps 208, 210 are conveniently performed together. As a practical matter, steps 202 and 204 could easily be performed simultaneously as could steps 220 and 206.

Still further, it may be advantageous to store the antenna received signal indications (e.g. amplitude) for each reception pattern condition in a separate register in the data memory of microcomputer 82. Then, after the sequence of all significant conditions is completed, the stored indications for each antenna condition can be compared against each other and against a predetermined amplitude condition readily allowing other criteria than maximum amplitude to be the basis upon which a preferred antenna condition is selected.

Still further, it may be advantageous to store the selected antenna condition for each VHF-TV channel in a separate memory that retains stored information when the TV receiver is turned off. Thus, once the evaluation process is completed, it need not be repeated unless power is removed from the receiver as would occur when it is physically relocated. This would tend to reduce the delay and possible picture and sound interferences during the time immediately following selection of a new VHF-TV channel (after the first automatic steering sequence, of course).

What is claimed is:

1. In a receiver having a tuning system for selecting a channel frequency to be received, apparatus comprising:
   a loop antenna;
   switch means cooperating with said loop antenna responsive to an electrical control signal for producing a plurality of reception pattern conditions of said loop antenna;
   comparison means for determining the amplitude of signals received from said loop antenna with each said reception pattern condition and for automatically determining when said reception pattern condition produces said received signal of a predetermined amplitude condition; and
   control means responsive to said comparison means for applying said electrical control signal to said switch means to establish said loop antenna in the reception pattern condition for said predetermined amplitude condition.

2. The apparatus of claim 1 wherein said comparison means comprises:

detecting means for generating a varying d.c. signal responsive to the amplitude of said received signal, and means for measuring the amplitude of said varying d.c. signal.

3. In the apparatus of claim 2: processing circuit means included within said receiver for processing said received signal, which processing circuit means exhibits a variable gain factor; and means for applying said varying d.c. signal to said processing circuit means to control said variable gain factor.

4. The apparatus of claim 3 wherein said processing circuit means includes a radio-frequency amplifier within said tuning system, and wherein said varying d.c. signal is an automatic gain control signal for said radio-frequency amplifier.

5. The apparatus of claim 2 wherein said tuning system converts said received signal to an intermediate frequency signal, and wherein said received signal to which said detecting means is responsive is said intermediate frequency signal.

6. In the apparatus of claim 5: processing circuit means included within said receiver for processing said intermediate frequency signal, which processing circuit means exhibits a variable gain factor; and means for applying said varying d.c. signal to said processing circuit means to control said variable gain factor.

7. The apparatus of claim 5 wherein said processing circuit means includes an intermediate frequency amplifier, and wherein said varying d.c. signal is an automatic gain control signal for said intermediate frequency amplifier.

8. The apparatus of claim 1, 2, 3, 4, 5, 6 or 7 wherein the predetermined amplitude condition is that at which said received signal is of highest amplitude.

9. The apparatus of claim 2 wherein said means for measuring includes:
a capacitor;
means for developing a first predetermined charge level on said capacitor;
means for applying said further signal to said capacitor for a predetermined period of time to change the charge level thereon from said first predetermined level; and
means for determining a quantity, which quantity is said change of the charge level on said capacitor.

10. The apparatus of claim 2 wherein said means for measuring includes:
a capacitor;
means for developing a first predetermined charge level on said capacitor;
means for selectively applying said further signal to said capacitor to change the charge level thereon from said first predetermined level to a second predetermined level; and
means for determining a quantity, which quantity is the period of time for which said further signal is applied to said capacitor to change the charge level thereon from said first to said second predetermined level.

11. The apparatus of claim 9 or 10 wherein said control means includes:
sequencing means for generating said electrical control signal to cause said loop antenna to sequentially produce said plurality of reception pattern conditions responsive to a selection of said channel frequency;

means for causing said means for developing to discharge said capacitor responsive to said sequencing means and for causing said means for applying to apply said further signal when said capacitor is discharged substantially to said first predetermined charge level for each of said plurality of reception pattern conditions;
memory means responsive to said sequencing means for storing at least said determined quantity corresponding to said reception pattern condition corresponding to said predetermined amplitude condition; and
means responsive to said sequencing means for retrieving from said memory means the stored determined quantity for said predetermined amplitude condition and for generating said electrical control signal corresponding thereto.

12. In the apparatus of claim 1 wherein said received signal includes a television composite video signal of substantially constant periodicity, said comparison means comprising:
first detection means for detecting a first predetermined portion of said composite video signal;
second detection means responsive to said first detection means for determining the presence of a second predetermined portion of said composite video signal related to said first predetermined portion and subsequent in time thereto within the period of said composite video signal; and
means responsive to the difference between said first and second predetermined portions respectively detected by said first and second detection means for determining said predetermined amplitude condition.

13. The apparatus of claim 12 wherein said first predetermined portion is the amplitude of a synchronizing pulse included in said composite video signal.

14. The apparatus of claim 12 or 13 wherein said predetermined amplitude condition is that at which the difference between the detected said first and second predetermined portions is of highest amplitude.

15. The apparatus of claim 1 wherein said loop antenna is a loop antenna having at least one control gap therein and wherein each said control gap has one of said switch means coupled thereacross.

16. The apparatus of claim 15 wherein each said switch means is a diode means, said diode means being rendered in a relatively conductive state when said electrical control signal is of first polarity to condition said diode means for forward conduction, and said diode means being rendered in a relatively nonconductive state when said electrical control signal is of second polarity opposite to the first.

17. The apparatus of claim 16 wherein said electrical control signal is conducted to said diode means by said loop antenna.

18. The apparatus of claim 1 wherein said control means comprises:
sequencing means responsive to a selection of said channel frequency for generating said electrical control signal to cause said antenna to sequentially produce each of said plurality of reception pattern conditions;
memory means responsive to said comparison means for storing an indication of said electrical control signal at which said predetermined amplitude condition occurs;

means for detecting when all of said plurality of reception pattern conditions have been produced; and means responsive to said means for detecting for generating said electrical control signal responsive to the stored indication in said memory means.

19. In the apparatus of claim 18 wherein indications of the amplitude of said received signals and of said electrical control signals for all said plurality of reception pattern conditions are stored in said memory means, said comparison means determining which of said stored indications is of said predetermined amplitude condition responsive to said means for detecting.

20. In the apparatus of claim 18 wherein indications of the amplitude of said received signals and of said electrical control signal for a first reception pattern condition in the sequence thereof produced by said sequencing means are stored in said memory means, and wherein thereafter present indications of the amplitude of said received signals and of said electrical control signal are produced for each subsequent reception pattern condition, said comparison means being responsive to said sequencing means to then determine which one of said present and stored indications is of said predetermined amplitude condition, and said memory means then storing that determined one of said present and stored indications.

21. In a television receiver having a loop antenna for receiving signals coupled to a tuning system for selecting a channel frequency to be received, and having processing circuit means for further processing the received signal for said channel frequency selected, said receiver including means generating a varying d.c. signal responsive to the magnitude of said received signal, the improvement comprising:

switch means having at least an open state and a closed state, said loop antenna having at least one control gap across which said switch means is coupled for controlling the directionality of the response thereof responsive to an electrical control signal; and control means for selecting the state of said switch means including sequencing means, responsive to a selection of said channel frequency by said tuning system, for sequentially applying a sequence of said electrical control signal to said switch means, analog to digital conversion means for determining when the amplitude of said varying d.c. signal associated with each said electrical control signal is of a predetermined amplitude condition, and detection means responsive to said sequence being completed for causing said sequencing means to apply that said electrical control signal associated with said varying d.c. signal of predetermined amplitude condition.

* * * * *